(12) United States Patent
Smith et al.

(10) Patent No.: US 6,505,477 B1
(45) Date of Patent: Jan. 14, 2003

(54) WATER GENERATOR

(75) Inventors: Shayne D. Smith, South Weber, UT (US); Joeseph W. Stewart, Hooper, UT (US)

(73) Assignee: Cloud Nine of Utah, Inc., Riverdale, UT (US)

( * ) Notice: Subject to any disclaimer, the term of this patent is extended or adjusted under 35 U.S.C. 154(b) by 0 days.

(21) Appl. No.: 09/707,667

(22) Filed: Nov. 7, 2000

(51) Int. Cl.[7] ............................................. F25D 21/14
(52) U.S. Cl. ............................ 62/291; 62/318; 62/285
(58) Field of Search ........................... 62/318, 285, 291

(56) References Cited

U.S. PATENT DOCUMENTS

| | | | |
|---|---|---|---|
| 4,351,651 A | 9/1982 | Courneya | |
| 4,572,785 A | * 2/1986 | Braaten | ............... 210/181 |
| 5,106,512 A | 4/1992 | Reidy | |
| 5,149,446 A | 9/1992 | Reidy | |
| 5,212,958 A | * 5/1993 | Anderson | ............... 62/150 |
| 5,259,203 A | * 11/1993 | Engel et al. | ............... 62/150 |
| 5,301,516 A | 4/1994 | Poindexter | |
| 5,398,517 A | 3/1995 | Poindexter | |
| 5,517,829 A | 5/1996 | Michael | |
| 5,669,221 A | 9/1997 | LeBleu et al. | |
| 5,701,749 A | * 12/1997 | Zakryk | ............... 62/93 |
| 5,845,504 A | 12/1998 | LeBleu | |
| 6,058,718 A | * 5/2000 | Forsberg et al. | ............... 62/125 |

* cited by examiner

*Primary Examiner*—William C. Doerrler
*Assistant Examiner*—Mark Shulman
(74) *Attorney, Agent, or Firm*—Brian C. Trask

(57) ABSTRACT

An apparatus to extract water from ambient air. The apparatus includes a dehumidifier, a holding tank, and one or more dispensing tanks in which water is maintained hot or cold. Provision is made to recycle water in the holding tank through an aerator to prevent stagnation of stored water. Water from the holding tank is pumped through a filter system before entering the dispensing tanks. A safety control is provided to prevent overflowing a collection pump reservoir in event of interruption in normal water flow in the machine. Provision is made to control bacteria and algae.

20 Claims, 3 Drawing Sheets

WATER GENERATOR

BACKGROUND

Field of the Invention

This invention relates to the recovery of potable water from ambient air. It is specifically directed to a machine adapted to recover and purify water contained in ambient air.

Background Art: U.S. Pat. Nos. 5,669,221 and 5,845,504, the disclosures of which are incorporated by reference, describe portable water dispensing machines capable of recovering liquid water from the humidity of ambient air. These machines are constructed and arranged to draw in moisture-laden air from the surroundings, and to cool the resulting stream of air to below its dew point, thereby recovering liquid water. The recovered water is then sanitized for human use. The sanitization process may involve UV radiation treatment and various forms of filtration.

Various other apparatus constructed and arranged for extracting potable water from moisture laden air are described in U.S. Pat. Nos. 4,351,651; 5,106,512; 5,149,446; 5,259,203; 5,301,516; 5,398,517; 5,517,829 and 5,701,749. The '651 patent, to Courneya, discloses a water generator using a heat sink positioned below the surface of a body of water or earth. The temperature at a condensation surface achievable with this arrangement necessarily limits the operating range of the device and water output. Furthermore, this device cannot be easily transported for use indoors. No provision for bacterial control is made.

The '512 patent, to Reidy, teaches a portable water generator with provisions to fill a single removable internal water container, or to manually divert water production to an external container for storage. Reidy's device uses a fan to pass filtered air from an entry port located at the device's front, through a dehumidifier, and to an exit port located at the device's rear. Recovered water is treated with UV radiation and filtration. No provision is made to control the temperature of the stored water. The '446 patent, also issued to Reidy, teaches a similar apparatus, but lacking provisions for subsequent treatment of collected water. An illustrated device has an air ducting arrangement to provide outside air to a device operating indoors.

The '203 patent, to Engel et al., discloses a compact device to extract water from air using a refrigeration system. Provisions may be made to provide dispensable warm or cool water. The refrigeration system used to condense water from the air is also used to heat or cool the stored water. Collected water is filtered, but not additionally treated.

The '516 patent, to Poindexter, teaches a device to extract water from air. This device uses refrigerated cooling coils to condense water from air ducted through a cabinet. Collected water passes under influence of gravity from a collection pan to a single collection container through a filter. No further treatment of the collected water is disclosed. The device is designed for easy access to clean condenser coils and associated structure. No provision is made for dispensing water at temperatures above or below ambient. The '517 patent, also to Poindexter, is a continuation of the application which issued as the '516 patent. This subsequent patent discloses a cleaning apparatus to clean a coil and collection pan in a water extracting device.

The '829 patent, to Michael, discloses a water generating device using either a refrigerated or thermoelectric water condenser. Generated water is filtered and treated with a disinfectant prior to storage in a container. The water is again filtered to remove bacterial residue, viruses, germs and the like, as well as residual disinfectant, when pumped from the storage container to a dispensing tap.

The '749 patent, to Zakryk, teaches a water generator apparatus using a refrigerated fin and tube condensing unit. Water condensed on the condensing unit flows by gravity directly into a collection reservoir. Water stored in the collection reservoir is filtered and may be exposed to UV radiation prior to being dispensed through a delivery coil of conduit and then to a spigot. As long as sufficient water is present in the apparatus, a quantity of filtered water remains in the delivery coil at all times, ready for immediate dispensing. The delivery coil, and water contained therein, are cooled by submersion in the collection reservoir. Water in the delivery coil is prevented from stagnating by periodic cycling of a valve to permit water flow through a return loop to the collection reservoir.

The above discussed water generator devices are perhaps adequate for their intended purposes. However, improvements in ease of use, reduction in cost, optimizing process parameters including air flow and condensation, preventing overflow, and maintaining the quality of recovered water are still desired.

SUMMARY

The present invention comprises an improved water generator constructed and arranged in a fashion generally similar to that disclosed by the '221 and '504 patents, but adapted to avoid some the inconveniences and costs associated with the construction and operation of those and other previous designs. Of particular significance, water is pumped from a collection pump through an aerator into a holding tank. Collected water may be treated with ultraviolet (UV) radiation to destroy pathogens prior to storage in the holding tank. In a preferred embodiment, water in the holding tank is intermittently circulated through an aerator. Upon demand, water is drawn from the holding tank to either of secondary cold water or hot water tanks. This demand stream is drawn through a filtering system. Preferred embodiments make use of a spiral condensation coil to improve condensation collection. It is generally preferred to utilize an electric probe for chilling, although FREON and cold plate chilling systems are operable. Chilled water may be circulated through an auxiliary condensation system, whereby to increase the rate of water recovery.

In general, an embodiment of the invention includes a cabinet enclosure having a volume defined by a front, a rear, and first and second sides. A fluid collection system and a fluid dispensing system are at least substantially contained within the cabinet. Preferred embodiments are arranged for intake of ambient air through the first side, then through a dehumidifier, then exhausted through the second side. Such an arrangement allows the invention to be stored near a wall without impeding the air flow.

While any commercially available dehumidifier is operable, it is preferred to use a dehumidifier having a first water condensation surface arranged in a substantially circular coil. Such a configuration generally maximizes a water condensation surface area and tends to drip recovered water into a more centralized location for convenient collection. It is further preferred to orient the coil to have its effective diameter oriented substantially vertical and perpendicular to the direction of air flow through the coil. In certain embodiments, the dehumidifier may also include a second water condensing surface which is cooled by circulation of chilled recovered water. The second surface may be arranged either upstream or downstream of the first surface with respect to the air flow across the surfaces.

The fluid collection system typically includes a dehumidifier, a pump reservoir, and a holding tank to receive recovered water. The pump reservoir is generally located below a condensation collecting coil of the dehumidifier for gravity assisted collection of recovered water. A collection pump moves recovered water from the pump reservoir to the holding tank through a first fluid path. A collection control apparatus cycles the collection pump on and off based, in part, on the water level in the pump reservoir. The collection pump is prevented from running if too little water is present in the pump reservoir. When water in the pump reservoir is at an operating high level, the collection pump is turned on, unless the holding tank is sufficiently full. The collection control apparatus also cycles the dehumidifier. The dehumidifier is turned off when the water in the holding tank is at a sufficiently high level. The dehumidifier is turned on when the holding tank is below the operating high point. A pump reservoir level safety control apparatus, such as a low cost float safety switch for automatic shutoff of the dehumidifier may be included as part of the collection control apparatus. Such a safety switch operates to prevent overflow of the pump reservoir in event of failure of the collection pump, electricity failure, clogging of the filtration system, or for other causes preventing normal operational water flow.

It is currently preferred that a bacterial treatment apparatus and an aerator apparatus are disposed in the first fluid path. A desirable bacterial treatment apparatus may be a UV light source, or an bacterially effective filter. Provisions for intermittent recycling of the water from the holding tank through an aerator may be made to avoid its stagnation. The water is also intermittently recycled through the bacterial treatment apparatus in certain preferred embodiments. A preferred recycling loop also encompasses water held within the pump reservoir. It is within contemplation to include a chemical based algae prevention system to treat water in the holding tank, such as a chlorine drip.

The fluid dispensing system typically includes one or both of a cold water tank adapted to chill and store water contained therein below ambient temperature, and a hot water tank adapted to heat and store water contained therein above ambient temperature. The dispensing system also includes a demand pump and a demand control apparatus. The demand pump moves water from the holding tank through a filtration system to the hot or cold water tanks. The demand control apparatus operates the demand pump in response to a withdrawal of water from the hot or cold water tanks. The hot or cold water tanks are typically adapted to dispense water by gravity feed through spigots. The spigots typically are carried on the front of the enclosure at a convenient elevation for dispensing fluids.

BRIEF DESCRIPTION OF THE DRAWINGS

In the drawings, which illustrate what is currently regarded as the best mode for carrying out the invention.

DETAILED DESCRIPTION OF THE ILLUSTRATED EMBODIMENTS

Reference will now be made to the drawings in which the various elements of the invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
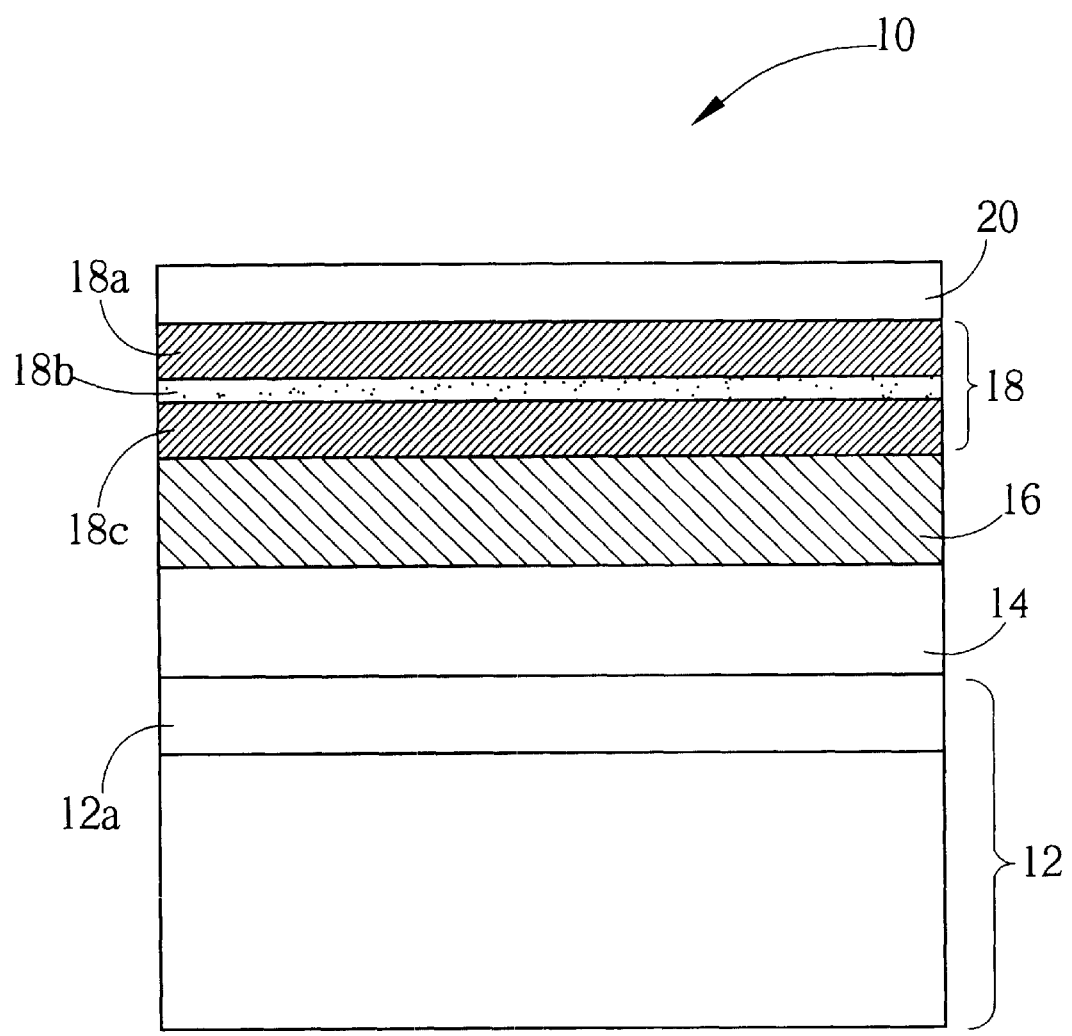
FIG. 1 is an illustration in perspective of a typical embodiment of the invention, partially broken away to show internal components.

FIG. 1 illustrates the typical placement of internal components of an exemplary water generator, generally indicated at 10, within a cabinet or housing 38. Certain portions of cabinet 38 are removed in the illustration to enable viewing the various constituent internal components. Cabinet 38 typically has a front 40, rear 44, and first and second sides 48 and 52 respectively. A cabinet 38 may be any convenient size and conformation in which to substantially contain a water collection apparatus 56 and a water dispensing apparatus 58. Preferred cabinets present an attractive, finished appearance for the water generating apparatus 10.

A water collection apparatus 56 typically includes a dehumidifier 62, a collection pump 66, and a holding tank 70. An air stream is established, typically by a fan 72, across the condensing coil 74 from one side of the machine 10 to the other side. It is preferred that the air stream enters through inlet port system 78 located on a side 48, and exits through outlet port system 82 located on an opposite side 52. An air filter 84 is typically positioned upstream of the dehumidifier 62 to filter particulate matter from the airstream and limit debris collected with recovered water. An air filter 84 may be an electrostatic filter, fiber mat, paper filter, or any other device operable to limit debris in the recovered water. Because air flow is from side-to-side, it is feasible to position the cabinet 38 with its rear 44 against a wall.

Water recovered by condensation from the air stream drains from the condensing coil 74 onto a drip tray 86, from which it is directed into a pump reservoir 90. Drip tray 86 is typically constructed with a sloped bottom surface to urge water to a central drain location. It is currently preferred to position pump reservoir 90 below drip tray 86 for gravity assisted transport of recovered water, typically through a collection tube 92. The reservoir 90 is provided with a control float 94 (see also FIG. 2) operable to control an associated collection pump 66. A low cost level control apparatus, such as safety float 98 rigged to operate a switch, is also preferably included to prevent overflow of the reservoir 90.

With continued reference to FIG. 1, water collected in reservoir 90 is intermittently pumped through supply tube 102 by collection pump 66 for storage in holding tank 70. A bacterial treatment apparatus 106 is generally provided in a collection apparatus 56 to maintain potable water quality in the holding tank. The bacterial treatment apparatus 106 may also include a filter system to remove particulate matter from the recovered water prior to storage in holding tank 70. A bacterial treatment apparatus 106 may advantageously be provided in-line with supply tube 102, as illustrated. The bacterial treatment apparatus may be an ultra violet (UV) light source, a bacterially effective filter, or any other treatment device or system effective substantially to limit viability of bacteria. It is within contemplation to provide a bacterial treatment apparatus 106 as a UV light disposed to radiate, on an intermittent or continuous basis, inside the holding tank 70.

An aerator 110 is desirably disposed to supply oxygen to water pumped into holding tank 70. For purpose of this disclosure, an aerator is any device operable to promote oxygen uptake in water in excess of that achievable in a cascade of a substantially solid stream exiting from a supply conduit. An exemplary aerator 110 includes a screen element disposed to break up a solid supply water stream, thereby to create increased surface area for oxygen uptake. It is also within contemplation to provide an air bubbler, as commonly found in aquariums, embodied as an aerator 110 to introduce oxygen into water stored in the holding tank. Maintaining a level of oxygen in the stored water is important for palatability of the water dispensed from a machine 10. Stored water tends to deplete in oxygen and often develops a "flat", unappealing taste.

Still with reference to FIG. 1, a water dispensing system 58 according to this invention includes a filter system 1 14, a demand pump 1 18, and one or more dispensing reservoirs, such as cold water tank 122 and hot water tank 126. Such tanks are provided chillers or heaters, as appropriate. When water is dispensed (through taps, not shown, connected to the final holding tank(s) 122, 126), the demand pump 118 operates to replace water withdrawn from either the hot water tank 126 or the cold water tank 122. This replacement water is withdrawn through demand conduit 130 from the initial holding tank 70, and is forced through the filtration system 114. A filtration system 114 may include one or both of a particulate filter 134 and a taste and odor filter 138. The filter system may also be fashioned as a single combination filter element. Locating the filter system 114 immediately before the dispensing tanks 122, and 126 if present, is an important part of this invention. Such positioning provides the best quality water in the dispensing tanks by filtering the oxygenated water at the last moment before temporary storage in the dispensing tanks. A demand control system is provided to maintain fluid levels in tanks 122 and 126.

Figure 2:
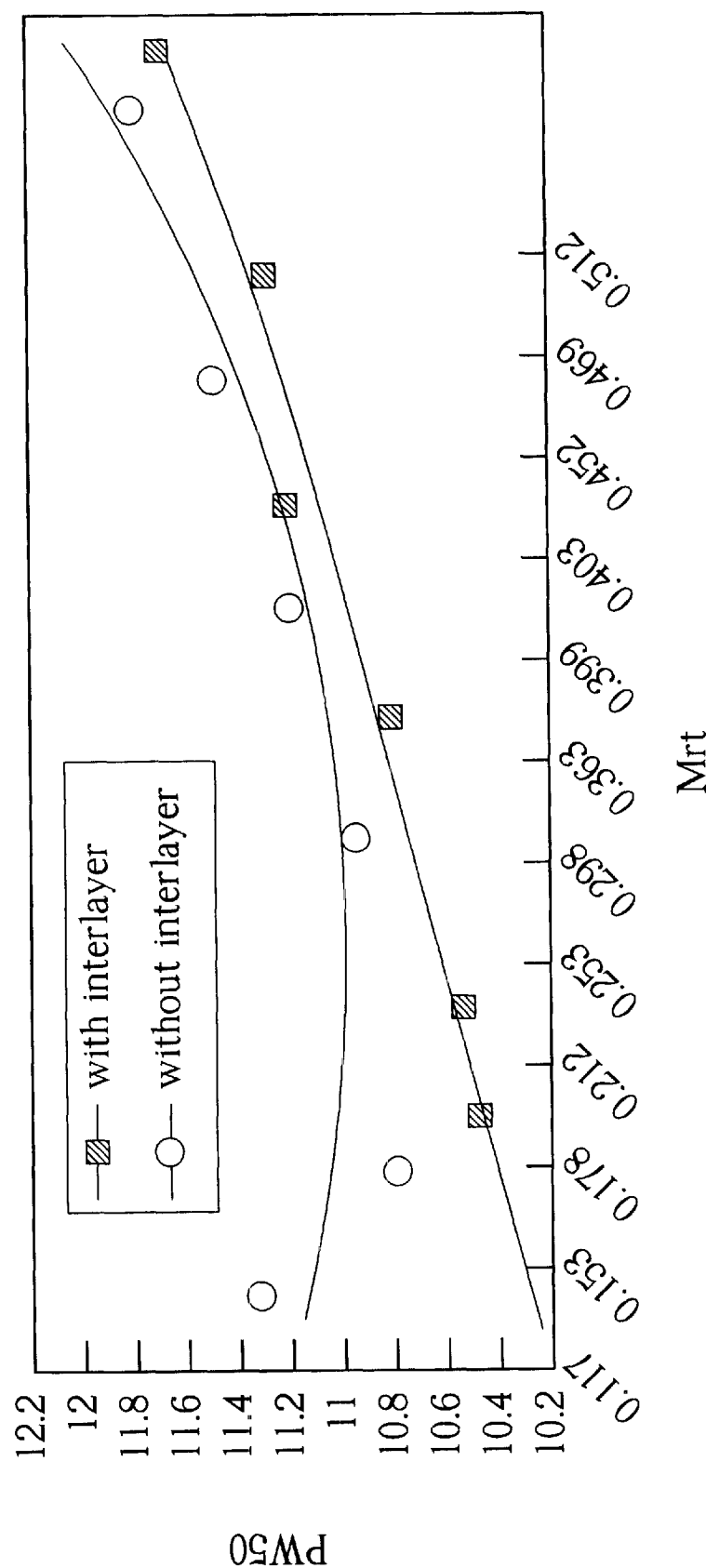
FIG. 2 is a schematic illustrating the operation of a preferred dehumidifier.

The operation of the machine 10 can best be further explained with reference to FIGS. 2 and 3. FIG. 2 illustrates a desirable safety control arrangement between the dehumidifier 62 and pump reservoir 90. Water drips from condensing coil 74, onto drip plate 86 and into conduit 92, then is directed to reservoir 90. During normal operation, when float 94 reaches an operational high fluid level position, pump 66 is typically energized to move water from the reservoir 90 to the holding tank 70. If the holding tank 70 is full, the pump 66 and dehumidifier 62 are turned off by operation of a holding tank level control, such as a float 142. A safety control, such as float 98, is desirably provided to prevent overflow of reservoir 90 in the event of an interruption in normal water flow. Examples of such interruptions nonexclusively include: failure of pump 66, blockage of the flow through supply tube 102, electrical outage, or failure in a level control system. Safety control 98 would then operate to turn off the dehumidifier to prevent overflow of reservoir 90.

Figure 3:
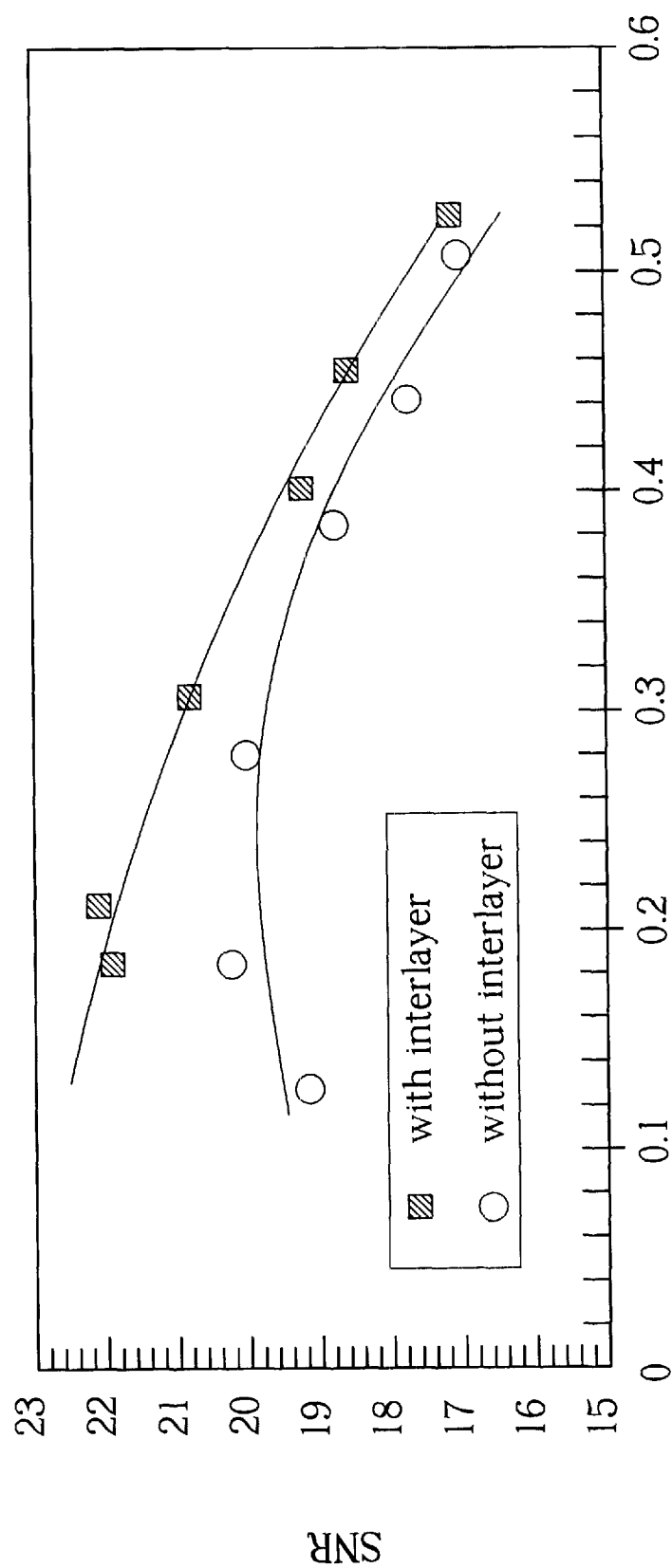
FIG. 3 is a flow chart illustrating the operation of the apparatus of FIG. 1.

Referring now to FIG. 3, provision is preferably made for at least an intermittent recirculation of water in the holding tank 70. One recirculation path may be illustrated by a recirculation conduit 142 in a loop through treatment apparatus 106. An alternate, and currently preferred arrangement includes recirculation of water through the pump reservoir 90, such as by way of recirculation conduit 146. The latter recirculation loop advantageously prevents stagnation of water in both holding tank 70 and reservoir 90. The recirculation circuit may or may not include a pass through a UV treatment apparatus, although aeration of the recirculated water is desirably included. It has been determined that excessive UV treatment causes a disagreeable ozone flavor in water. Use of a bacterially effective filter is currently preferred in a water treatment apparatus 106 to avoid the ozone flavor problem. As an additional measure to prevent growth of algae in water within the machine 10, it is within contemplation to provide a chemical deterrent to algae growth, such as a chlorine drip (not illustrated). Such a chlorine drip is advantageously positioned to treat water in the holding tank 70. The treatment chemical, such as chlorine, may be removed by a filter element of filter apparatus 114, prior to storage of the water in tank 122 or 126.

Water generating machines 10 may be embodied in any desirable size. For a typical home consumer model, intended to supply the needs of a single family, a holding tank 70 may be sized to hold on the order of about two-and-a-half gallons of water or more. A corresponding cold water tank 122 or hot water tank 126 would typically hold between about one-half gallon to about one gallon each. The final storage tanks 122, 126 are sized to provide a reservoir of desired temperature water sufficient for several uses. However, the tank(s) are small enough that water turnover during normal consumption use prevents stagnation of the water stored therein.

A cabinet 38 in which to house the necessary components may be about 18 inches square, and 48 inches tall. Such a cabinet provides ample elevation for hot and cold water tanks to dispense stored water by gravity feed through dispensing tubes 148 and spigots 150. The cabinet 38 typically carries dispensing spigots 150 on a front panel at a convenient elevation for user interaction. Components of the machine 10 may be scaled up in size as desired to provide water for an addition number of people. Also, in harsh environments, such as in operation outside near a disaster area, provision may be made to effectively seal the cabinet against insects, blowing dust, and debris.

While any commercially available dehumidifier 62 is workable in a machine 10, it is desirable to provide a substantially circular condensing coil 74 to maximize the area on which water vapor may condense. Condensing coil 74 is preferrably disposed in a substantially vertical arrangement, and substantially perpendicular to the air stream. While the coil 74 in FIG. 1 is illustrated as being in one plane, it is within contemplation that the coil system have two or more stacked coils forming a coil system 74 to provide additional condensing area distributed through a volume. Coils need not be perfectly circular to provide the desired advantages in centralized water collection and increased collection surface area. Ovalized or other shaped coils may be provided, as an example in certain cases, to better fill the cross-section through which air is caused to flow. It is further within contemplation to provide an additional coil system that is cooled by recirculation of chilled recovered water. Such a coil system may advantageously be placed upstream of the coil 74 to provide a preconditioning chill to the air stream and thereby condense additional water from the air. One advantage of a substantially circular condensing coil is the tendency of water condensed on such a coil to drip into a more centralized location onto a drip pan 86.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a potable water recovery and dispensing system of the type in which water is recovered from moisture entrained in ambient air and is sanitized and stored prior to being dispensed, the improvement comprising:

collection apparatus constructed and arranged to direct such recovered water through an aerator to a first holding tank;

treatment apparatus constructed and arranged to circulate water accumulated in said first holding tank through a bacterial treatment zone;

demand pumping apparatus positioned to supply water from said first holding tank through a filtration system to at least one water dispensing reservoir; and control apparatus constructed and arranged to operate said demand pumping apparatus in response to a withdrawal of water from said dispensing reservoir.

2. The system of claim 1, said collection apparatus comprising a first water condensate collection surface arranged in a first substantially circular coil, said first coil having a diameter oriented substantially perpendicular to a direction of flow of said ambient air.

3. The system of claim 1, said collection apparatus further comprising a safety switch for automatic shutoff of a dehumidifier water source in event of an interruption in normal operational water flow.

4. The system of claim 1, said collection apparatus being arranged for circulation of ambient air into a first side of said system, through a dehumidifier, and out of a second side of said system, whereby a rear of said system may be placed in close proximity to a wall without obstructing flow of said air.

5. The system of claim 1, comprising a first water dispensing reservoir adapted to chill water contained therein and a second water dispensing reservoir adapted to heat water contained therein.

6. The system of claim 5, said collection apparatus further comprising a second water condensate collection surface arranged in a second substantially circular coil, said second coil being cooled by circulation of chilled recovered water.

7. The system of claim 1, said treatment zone comprising a water filter.

8. The system of claim 1, said treatment zone comprising a UV source.

9. The system of claim 8, said UV source being located to radiate into a recirculation circuit for treatment of water in a substantially continuous loop.

10. The system of claim 8, said UV source being located to radiate into said first holding tank.

11. The system of claim 1, said collection apparatus comprising a recirculation pump arranged in a circuit, comprising said aerator, to recirculate water from said first holding tank.

12. An apparatus for generating water, comprising:
    a cabinet having a volume defined by a front, a rear, and first and second sides disposed between said front and rear, said volume at least substantially housing a fluid collection system and a fluid dispensing system;
    said fluid collection system comprising:
        a dehumidifier to recover water from ambient air;
        a pump reservoir located below said dehumidifier for gravity assisted collection of said recovered water;
        a first holding tank;
        a first fluid path comprising a collection pump between said pump reservoir and said first holding tank;
        collection control apparatus operable to control said collection pump based on fluid level in said pump reservoir and operable to control said dehumidifier based on fluid level in said first tank; and
        a bacterial treatment apparatus and an aerator apparatus disposed in said first path;
    said fluid dispensing system comprising:
        a second holding tank adapted to chill water contained therein below ambient temperature;
        a second fluid path comprising a demand pump to pump water from said first holding tank through a filtration system to said second holding tank; and
        said demand control apparatus being constructed and arranged to operate a pump in response to a withdrawal of water from said second holding tank.

13. The apparatus of claim 12, further comprising a recirculation circuit for intermittent transport of water from said first tank, through an aerator, and back to said first tank.

14. The apparatus of claim 13, said fluid dispensing system further comprising:
    a third holding tank adapted to heat water contained therein above ambient temperature;
    said demand pump further being adapted to pump water from said first holding tank through a filtration system to said third holding tank; and
    said control apparatus further being constructed and arranged to operate said demand pump in response to a withdrawal of water from said third holding tank.

15. The apparatus of claim 14, further comprising air vents located on said first and second sides respectively to admit and exhaust ambient air flow through said dehumidifier whereby to allow positioning said apparatus with said rear in close proximity to a wall without detrimentally reducing said air flow.

16. The apparatus of claim 15, further comprising a pump reservoir level safety switch for automatic shutoff of said dehumidifier in event of an interruption in normal operational water flow.

17. The apparatus of claim 16, said dehumidifier comprising a first water condensing surface configured and arranged in a first substantially circular coil whereby to maximize a water condensation surface area, and with an effective diameter of said first coil being oriented substantially perpendicular to a direction of air flow through said coil.

18. The apparatus of claim 17, said dehumidifier comprising a second water condensing surface configured and arranged in a second substantially circular coil, and with an effective diameter of said second coil being oriented substantially perpendicular to a direction of said air flow, said second coil being cooled by circulation therein of chilled recovered water.

19. An apparatus for generating water, comprising:
    a fluid collection system comprising:
        a dehumidifier to recover water from ambient air;
        a pump reservoir located below said dehumidifier for gravity assisted collection of said recovered water;
        a first holding tank;
        a first fluid path comprising a collection pump between said pump reservoir and said first holding tank, with an aerator apparatus disposed in said first path;
        a recirculation circuit for intermittent transport of water from said first tank, through an aerator, and back to said first tank;
        collection control apparatus operable to control said collection pump and said dehumidifier; and
    a fluid dispensing system comprising:
        a second holding tank adapted to chill water contained therein below ambient temperature;
        a third holding tank adapted to heat water contained therein above ambient temperature;
        a second fluid path comprising a demand pump to pump water from said first holding tank through a filtration system to either of said second or third holding tank; and said demand control apparatus being constructed and arranged to operate a pump in response to a withdrawal of water from either of said second or third holding tank.

20. The apparatus of claim 19, further comprising:

air vents located on first and second sides of an enclosure, substantially housing said fluid collection and dispensing systems, to admit and exhaust ambient air flow through said dehumidifier whereby to allow positioning said apparatus with a rear in close proximity to a wall without detrimentally reducing said air flow; and a pump reservoir level safety switch for automatic shutoff of said dehumidifier in event of an interruption in normal operational water flow.

* * * * *